United States Patent [19]

Maro et al.

[11] Patent Number: 5,068,152
[45] Date of Patent: Nov. 26, 1991

[54] MAGNETIC RECORDING MEDIUM

[75] Inventors: Tsuyoshi Maro; Osamu Kitakami; Hideo Fujiwara, all of Ibaraki, Japan

[73] Assignee: Hitachi Maxell, Ltd., Osaka, Japan

[21] Appl. No.: 274,844

[22] Filed: Nov. 22, 1988

[30] Foreign Application Priority Data

Nov. 26, 1987 [JP] Japan .................. 62-298371
Apr. 28, 1988 [JP] Japan .................. 63-107302
Oct. 28, 1988 [JP] Japan .................. 63-272310

[51] Int. Cl.$^5$ .............................................. B32B 9/00
[52] U.S. Cl. .................................. 428/408; 428/446; 428/447; 428/694; 428/900
[58] Field of Search .............. 428/694, 695, 900, 408, 428/446, 447

[56] References Cited

U.S. PATENT DOCUMENTS 4,072,781  2/1978  Shirahata et al. .
4,414,271  11/1983  Kitamoto et al. .................. 428/695
4,476,195  10/1984  Ono et al. ......................... 428/695
4,657,812  4/1987  Hatanai et al. .................... 428/694

FOREIGN PATENT DOCUMENTS 218041  12/1983  Japan .
131629  7/1985  Japan .
128019  6/1987  Japan .

OTHER PUBLICATIONS

8101 I.E.E.E. Transactions on Magnetics, MAG-23, (1987), Sep., No. 5, (Part II of Two Parts), New York, N.Y., U.S.A.
European Search Report.

Primary Examiner—Merrell C. Cashion, Jr.
Assistant Examiner—Robert J. Follett
Attorney, Agent, or Firm—Birch, Stewart, Kolasch & Birch

[57] ABSTRACT

A magnetic recording medium comprising a non-magnetic substrate and a magnetic layer composed of a ferromagnetic material having a face-centered cubic structure and at least one of a carbon, silicon, a hydrocarbon compound and an organosilicone compound, provided on the non-magnetic substrate, has a high coercive force, a good head running property and a high durability.

19 Claims, 5 Drawing Sheets

MAGNETIC RECORDING MEDIUM

BACKGROUND OF THE INVENTION

2. Field of the Invention

1. This invention relates to a magnetic recording medium, and more particularly to a magnetic recording medium with improved magnetic characteristics and durability.

2. Discussion of Related Art

In order to attain the high density recording of a magnetic recording medium, a ferromagnetic thin film-type medium without a binder has been heretofore studied for practical application and practically used as a magnetic recording medium.

Ferromagnetic thin metallic films of CoNi, CoCr, etc. or thin films of such oxide as γ-iron oxide or Ba ferrite have been used as the ferromagnetic thin film.

Generally, magnetic recording media based on the ferromagnetic thin metallic films have a poor corrosion resistance and have a serious problem, particularly in the case of forming thinner films. Furthermore, thin metallic film media are softer than the ferrite or other ceramics used as a head slider or core material and have the problem that flaws, once formed, grow larger.

On the other hand, the ferromagnetic oxide has a lower saturation magnetization than that of a ferromagnetic metal, and thus a thin oxide film medium has a smaller output than that of a ferromagnetic thin metallic film medium.

Furthermore, a thin oxide film medium is very hard and rigid and when the thin oxide film medium is formed on a polymer film substrate it is very liable to be damaged due to even a small bending of the medium caused during the sliding on a head. When the thin oxide film medium is formed on a rigid substrate to make a hard disk, a head crushing is liable to take place owing to the hardness of the medium.

In order to improve the mechanical durability of the so called continuous film type medium on the basis of a ferromagnetic metal film or ferromagnetic oxide film, particularly the durability during the sliding on a head, Japanese Patent Publication No. 57-3137 proposes use of a compound film prepared by making columnar ferromagnetic material grow on a non-magnetic substrate and filling gaps between the ferromagnetic columns with an organic polymer as a recording magnetic layer. However, a compound magnetic layer having a desirable coercive force as a magnetic recording medium cannot only be obtained by simultaneous vapor deposition of the organic polymer and the ferromagnetic material contrary to the disclosure of the Japanese Patent Publication.

SUMMARY OF THE INVENTION

An object of the present invention is o solve the problems of low durability of a continuous thin film type medium and low coercive force of a compound medium encountered in the prior art and provide a magnetic recording medium with an appropriate coercive force and a distinguished durability.

As a result of extensive studies and tests, it has been determined that a magnetic layer comprising a ferromagnetic material having a face-centered cubic structure and at least one material selected from carbon, Si, hydrocarbon compounds and organosilicon compounds, has a high coercive force and a distinguished durability. It seems that the magnetic layer can have a high coercive force by enclosing the ferromagnetic material with a non-magnetic material comprising at least one of carbon, Si, hydrocarbon compounds and organosilicon compounds or by depositing the non-magnetic material at the grain boundaries of the ferromagnetic material grains.

It is preferable that the content of at least one of a carbon atom and Si atom in the magnetic layer is from 2 to 30% by atom. When the carbon atom and the Si atom are contained as hydrocarbon compounds and organosilicon compounds, respectively, the foregoing content range must be maintained in terms of the carbon atom and silicon atom. When all of the carbon, Si, hydrocarbon compound and organosilicon compound are contained in the magnetic layer, it is necessary that the content of all of these materials falls within the foregoing range in terms of carbon atom and silicon atom. Below 2% by atom, the coercive force is too low, whereas above 30% by atom, the magnetic layer turns non-magnetic or soft magnetic.

It has been further found that the coercive force can be even further improved by providing a specific intermediate layer between the magnetic layer and the non-magnetic substrate.

Still further it has been determined that a magnetic recording medium having a high coercive force and a high durability can be obtained with a magnetic layer comprising (a) a ferromagnetic material having a face-centered cubic structure and (b) at least one of a carbide and a silicide of the ferromagnetic material and at least one of (c) an amorphous carbon and amorphous silicon and (d) at least one of a hydrocarbon compound and an organosilicon compound. It is preferable that the content of at least one of the carbon atom and the Si atom is also in a range of 2 to 30% by atom.

Carbides or silicides of Fe, Co, Ni, etc. have a higher hardness, and thus it seems that the hardness can be increased on an average by the presence of at least one of the carbides and the silicides in the magnetic layer and also the mechanical durability can be substantiality improved over that of the continuous thin film-type medium. In this case, the coercive force can also be substantially improved by providing a specific intermediate layer between the magnetic layer and the non-magnetic substrate.

The magnetic layer can be formed by simultaneous vapor deposition of a ferromagnetic material having a face-centered cubic structure and at least one of a carbon atom, silicon atom, hydrocarbon compounds and organosilicon compounds. The vapor deposition for use in the present invention includes vacuum vapor deposition, sputtering ion plating, RF ion plating, ionized cluster beam process, plasma polymerization, chemical gas phase growth, etc. In case of vapor deposition of the at least one of a carbon atom and Si atom, the sputtering process is particularly preferable.

The hydrocarbon compounds for use in the present magnetic layer include organic polymers such as synthetic resin polymers and polymerizable monomers and oligomers capable of producing the organic polymers through polymerization and specifically include acrylic monomers and oligomers such as hydroxyethyl acrylate, hexanediol diacrylate, methyl-α-chloroacrylate, trimethylolpropane triacrylate, dipentanol hexacrylate, trimethylolpropane tridiethyleneglycol acrylate, urethane acrylate, etc. and ultraviolet or electron beam-curable resins of these acrylic monomers and oligomers, polyethylene, polyethylene terephthalate, polypropylene, polystyrene, polybutadiene, polycarbonate, polyamide, polyimide, polymethane, polyvinyl chloride, polyvinyl acetate, polyfluorocarbon polymers such as polytetrafluoroethylene.

The organosilicon compounds for use in the magnetic layer include, for example, silicone polymers such as silicone oil, and the like.

The foregoing polymers can have other functional groups of metals, OH, halogens, alkyl, etc. on the side chains at the alkyl chain. The organic compound can be introduced as a gas and polymerized on the substrate. The polymers used for the vapor deposition may be decomposed to low molecular weight polymers when vapor deposited. Thus, the polymer used for the vapor deposition may not be in accordance with the organic polymer in the magnetic layer in the atomic or molecular composition.

It is preferable to use Ni or a Ni-based alloy as a ferromagnetic material having a face-centered cubic structure in the magnetic layer of the present magnetic recording medium. It is further preferable that the Ni be in an acicular structure, irrespective of simple substance or alloy.

The Ni-based alloy means an alloy having a Ni content of at least 30% by atom. If the Ni content is below 30% by atom, the amount of non-magnetic material playing the role of magnetic separation of Ni or a Ni-based alloy will be smaller in the magnetic layer of a magnetic recording medium, resulting in an unsatisfactory magnetic separation, and the desired coercive force can be no more obtained.

The Ni-based alloy for use in the present invention includes Ni alloys with a transition metal or transition metals other than Ni, such as Ni-Fe, Ni-Co, Ni-Fe-Co, Ni-Mn, Ni-V, Ni-Ti, etc. Ni alloys with a rare earth metal or rare earth metals, Ni alloys containing Si, Ge, etc. and partially oxidized, nitrized or phosphorized Ni or Ni-based alloys.

The present magnetic layer comprises a ferromagnetic material, at least one of carbides and silicides of the ferromagnetic material and at least one of amorphous carbon and/or amorphous silicon and hydrocarbon compounds and/or organosilicon compounds and can be assayed according to XPS (X-ray photoelectron spectroscopy).

Since the present magnetic recording medium has a magnetic layer containing at least one of amorphous carbon and/or amorphous silicon and hydrocarbon compounds and/or organosilicon compounds, the magnetic recording medium has a low coefficient of friction. Particularly when a C or Si-containing polymer is used to introduce C or Si into the magnetic layer, the polymer in the magnetic layer shows a self-lubricating action and thus the resulting magnetic recording medium has a lower coefficient of friction than those of the continuous thin film-type magnetic recording medium and the magnetic layer containing C and/or Si as introduced in the atomic state as simple substances.

The intermediate layer applicable to the present magnetic recoridng medium is composed of a material whose lattice constant at the boundary surface with respect to the magnetic layer differs by less than 35% from the lattice constant of the acicular Ni or acicular Ni-based alloy in the magnetic layer, as provided thereon, at the boundary surface with respect to the intermediate layer. Specifically, the intermediate layer is composed of at least one of Ti, Sc, Zr, Ta, Ni, Ni alloys, elements of the 5th and 6th periods of Group VIII of the Periodic Table, such as Ru, Rh, Pd, Os, Ir and Pt, and elements of Group Ib of the Periodic Table such as Cu, Ag and Au, and preferably Ti.

The magnetic characteristics can be improved by providing the intermediate layer. The cause for particularly higher coercive force has not been clarified yet. Without any provision of the intermediate layer, the region of the magnetic layer near the substrate, that is, the initial growth portion, has no distinct grain boundaries and also the upper region has no distinct acicular crystal boundaries, when the cross-sectional structure of the film is observed with a transmission electron microscope. On the other hand, the region from the initial growth portion over to the acicular crystal portion can have distinct boundaries by providing an intermediate layer, and also the acicular crystal boundaries can be distinct throughout the thickness direction of the magnetic layer. Thus, it seems that the intermediate layer promotes the growth of the acicular crystal portion in the magnetic layer to be formed thereon. At least one of Ti, Sc, Zr, Ta, Ni, Ni alloys, elements of the 5th and 6th periods of Group VIII of the Periodic Table such as Ru, Rh, Pd, Os, Ir and Pt, and elements of Group Ib of the Periodic Table, such as Cu, Ag and Au, when formed on a substrate, takes a columnar structure, and the column diameter approximates to the diameter of acicular crystals in the magnetic layer on the intermediate layer, and thus it seems that the columnar crystals act as nuclei for the growth of the acicular crystals and promote their growth.

The thickness of the intermediate layer in the present magnetic recording medium is not essential for the present invention and generally is in a range of 50 Å to 2,000 Å. Below 50 Å, the effect upon promotion of acicular Ni crystal growth is not enough, whereas above 2,000 Å, the effect upon the crystal growth promotion is saturated, and a larger thickness makes the magnetic recording layer less economical.

Basically, the intermediate layer can be composed also of alloys, compounds, oxides or nitrides.

The magnetic recording medium having an intermediate layer can be prepared by forming an intermediate layer on a non-magnetic substrate by vapor deposition, and then simultaneously forming a ferromagnetic material composed of Ni or Ni-based alloy and at least one of carbon, Si, a hydrocarbon compound and an organosilicon compound thereon by vapor deposition.

When Ni or Ni-based alloy is used as a face-centered cubic metal, a good corrosion resistance can be obtained owing to the good corrosion resistance of Ni itself, but a thin film of corrosion products, oxide, hydroxide, sulfide, chloride, etc. is formed on the surface when used in the actual circumstance. Once these corrosion products are formed, the sliding characteristics with respect to the head will be deteriorated. Thus, it is desirable to provide a solid protective film on the magnetic layer. The coefficient of friction is increased by providing the solid protective film, and thus it is preferable to provide a lubricating layer on the solid protective film.

The solid protective layer can be composed of carbon, Ti, silicon oxide, zirconia, B, silicon nitride, boron nitride, boron carbide or silicon carbide and also can be composed of oxides or nitrides of metals used for the magnetic layer, that is, Ni or Ni-based alloys. The solid protective layer can be formed by vacuum vapor deposition, sputtering, ion plating, RF ion plating, chemical gas phase growth, plasma polymerization. Particularly, a $SiO_2$ solid protective film can be also formed by spin coating or spray coating based on chemical reactions.

A lubricant for use in the formation of the lubricating layer can be an aliphatic lubricant, a fluorine-based lubricant, or the like. The aliphatic lubricant includes saturated linear fatty acids such as capric acid, stearic acid, beheric acid, n-hentriacontanic acid, etc., unsaturated fatty acids such as linderic acid, oleic acid, linolic acid, etc., metal salts of the foregoing fatty acids, such as metal soap, alcohols, fatty acid amides, etc. All of the primary, secondary, tertiary and quaternary aliphatic acid amides can be used. Furthermore, esters of the foregoing fatty acids with monohydric or polyhydric alcohols, that is, fatty acid esters, can be also used. These lubricants can be used alone or in mixture.

The fluorine-based lubricant is preferably polyfluorocarbon lubricants, particularly perfluoropolyether.

The lubricant can be formed according to a wet process such as dipping, spin coating, spray coating, Langmuir-Blodgett technique, photo-gravure printing, etc. or according to vacuum vapor deposition. When the lubricant is applied to VTR tapes, a lubricating layer is formed on the back side of the tape in advance, and can be transferred onto the face side, that is, the solid protective layer, when the tape is wound around the reel.

The thickness of the solid protective layer is preferably at least 50 Å, and the thickness of the lubricating layer is preferably at least 10 Å. The total thickness of the solid protective layer and the lubricating layer is preferably not more than 500 Å. If the thickness of the solid protective layer is less than 50 Å and the thickness of the lubricating layer is less than 10 Å, the durability of the individual layers decreases, and if the total thickness of these two layers exceeds 500 Å, the spacing loss becomes larger.

In order to increase the adhesion between the lubricating layer, it is desirable to oxidize or nitrize the surface region of the solid protective layer.

DETAILED DESCRIPTION OF THE INVENTION

Figure 1:
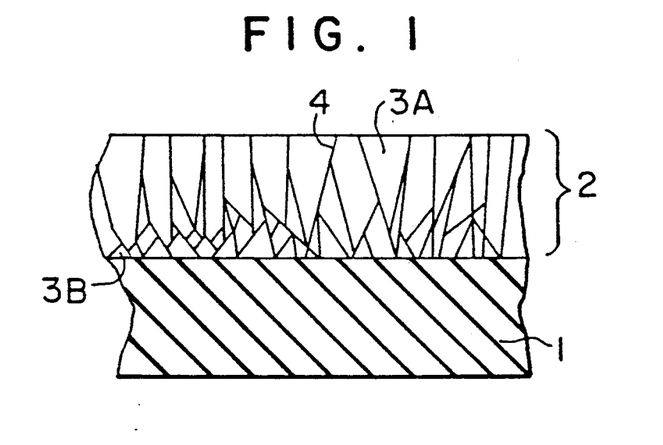
FIG. 1 is a schematic cross-sectional view of a magnetic recording medium according to one embodiment of the present invention.
Figure 2:
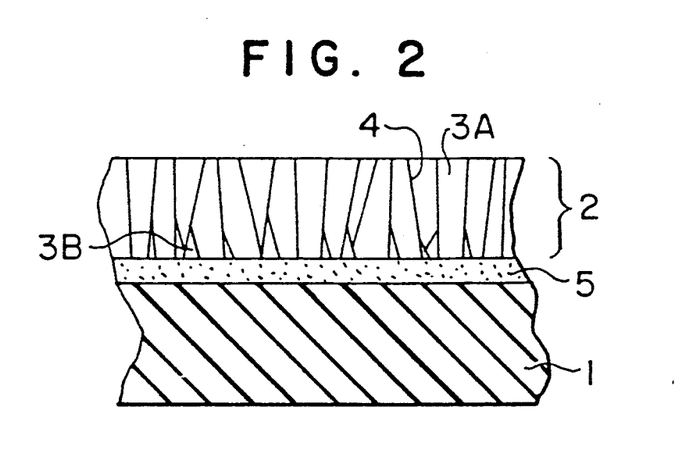
FIG. 2 is a schematic cross-sectional view of a magnetic recording medium having an intermediate layer according to another embodiment of the present invention.
Figure 3:
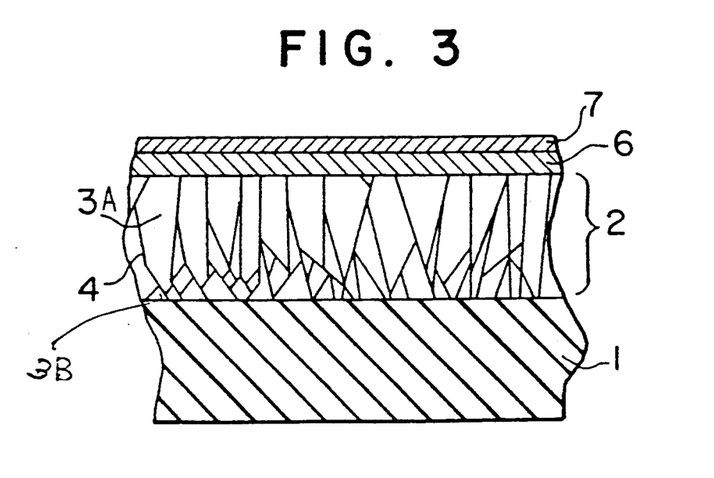
FIG. 3 is a schematic cross-sectional view of a magnetic recording medium having a solid protective layer and a lubricating layer according to other embodiment of the present invention.

The structure of the present magnetic recording medium will be described in detail below, referring to FIGS. 1 to 3 showing the schematic cross-sectional structures thereof.

As shown in FIG. 1, a magnetic layer 2 is formed on a non-magnetic substrate 1, and is composed of acicular ferromagnetic crystals 3A having a face-centered cubic structure, as substantially perpendicularly grown on the substrate 1. At least one of a non-magnetic material 4 of C, Si, carbon compounds and polysilicon compounds are precipitated in the clearances between the acicular ferromagnetic crystals 3A.

FIG. 2 shows is an intermediate layer 5 is provided between the non-magnetic substrate 1 and the magnetic layer 2. When the magnetic layer 2 is formed through the intermediate layer 5, development of fine crystal grains 3B are suppressed at the bottom region (initial growth region) of the magnetic layer, as shown in FIG. 2 in comparison with FIG. 1, and good acicular crystals can be formed.

FIG. 3 is a schematic cross-sectional view of a magnetic recording medium of FIG. 1, which has a further lamination of a solid protective layer 6 and a lubricating layer 7 on the magnetic layer 2.

The non-magnetic substrate for use in the present magnetic recording medium includes, for example, polymer films such as films of polyimide, polyethylene terephthalate, etc., glass sheet, ceramics sheet, metal sheets such as aluminum sheet, anodically oxidized aluminum sheet, brass sheet, etc., Si single crystal sheet, Si single crystal sheet with a heat-oxidized surface, etc. The non-magnetic substrate can be further provided, if necessary, with a polishing underlayer such as a nickel-phosphorus-based alloy layer, an alumite-treated layer, etc. for the surface polishing or texturing processing.

The magnetic recording medium includes various structures capable of sliding contact with a magnetic head, such as magnetic tapes or magnetic disks based on synthetic resin films such as polyester film, polyimide film, etc. and magnetic disks or magnetic drums based on disks or drums of synthetic resin film, aluminum sheet, glass sheet, etc.

PREFERRED EMBODIMENTS OF THE INVENTION

The preferred embodiments of the present invention will be further described in detail below, referring to the accompanying drawings.

Examples 1 to 6

Figure 4:
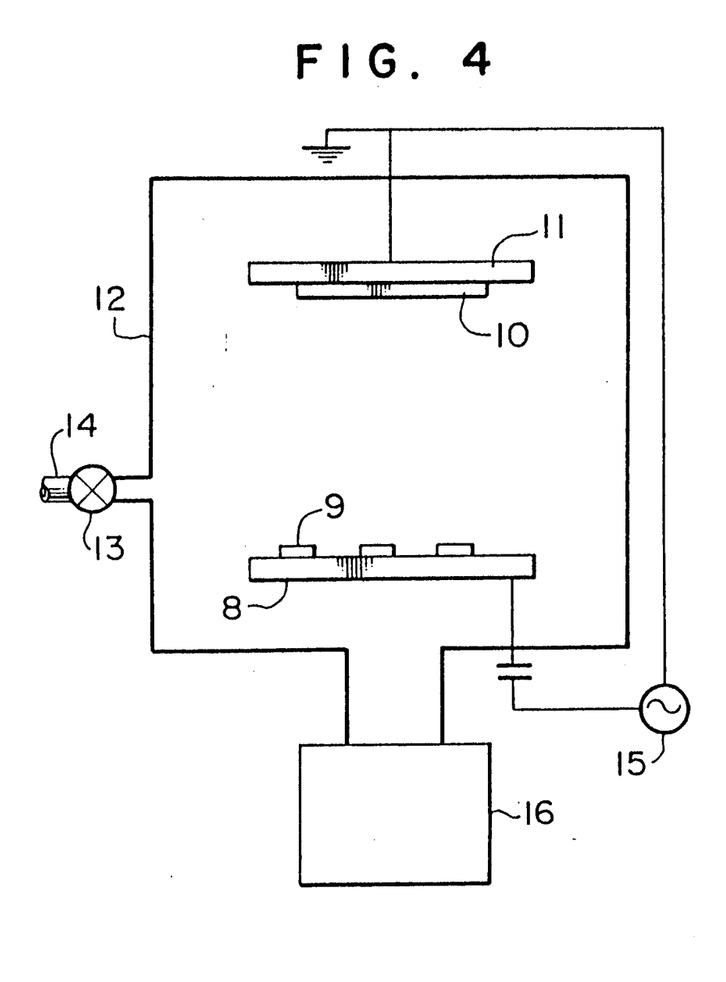
FIGS. 4 to 11 are schematic views of apparatuses for preparing magnetic recording media according to the present invention.

With a radio frequency sputtering apparatus comprising a vacuum chamber 12 provided with an Ar gas inlet 14 through a valve 13, an evacuation system 16, where a substrate holder 11 and a target 8 are provided at opposite sides in the vacuum chamber 12 and electrically connected with each other through a radio frequency power source 15, as shown in FIG. 4, films of Ni-C (Example 1), Ni—Si (Example 2), (NiCo)—C (Example 3), (NiCo)—Si (Example 4), (NiFe)—C (Example 5) and (NiFe)—Si (Example 6) were formed on substrate 10 on the substrate holder 11, respectively, under the following conditions.

1. Ferromagnetic target 8:
   (a) Ni
   (b) $Ni_{80}Co_{20}$
   (c) $Ni_{90}Fe_{10}$ On each ferromagnetic target 8 of (a), (b) or (c), C or Si chips 1, 2 mm×2 mm×1 mm thick, were placed so that the surface ratio of S:S' to be exposed to an Ar sputtering gas may be 1:2, where S is the surface area of ferromagnetic metal target 8 and S' is the surface area of C or Si chips 9.

2. Substrate 10: glass
3. Sputtering gas and pressure: Ar gas, 10 m Torr
4. Input power: 1.5 kW (13.5 MHz)
5. Substrate temperature: set to room temperature before the sputtering 6. Film thickness: 0.5 μm

Example 7

Figure 5:
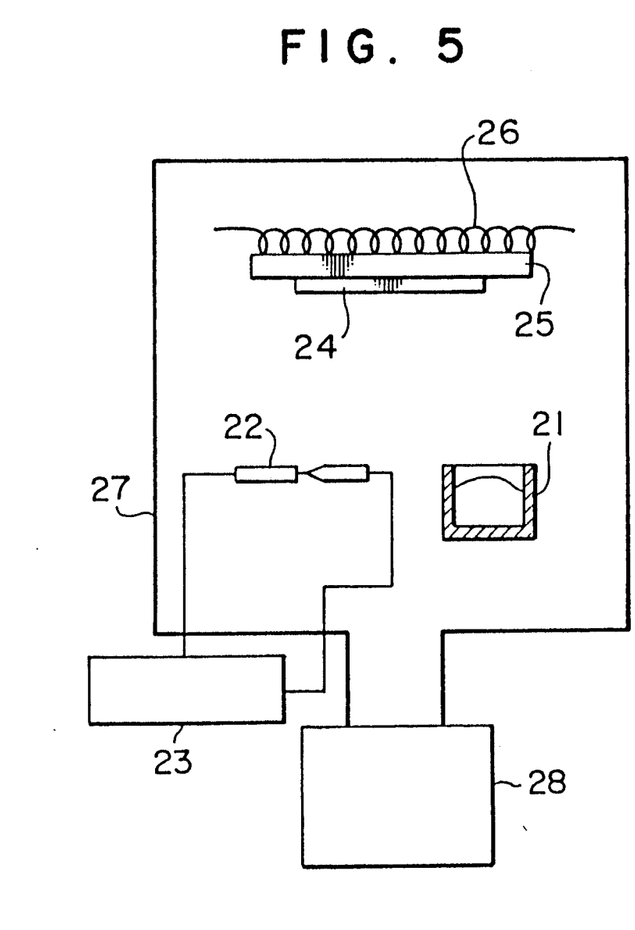

With a vacuum vapor deposition apparatus comprising a vacuum chamber 27 provided with an evacuation system 25, a substrate holder 25 with a substrate heater 26 and a substrate 24, a ferromagnetic material crucible 21 and a carbon rod 22 connected to a DC, high voltage power source 23, as shown in FIG. 5, a Ni-C film was formed on the substrate 24. Ni was placed in the crucible 21 as a ferromagnetic material and subjected to vacuum vapor deposition by heating with an electron gun, whereas C was subjected to vacuum vapor deposition from the carbon rod 22 by electric arc discharges. The vapor deposition conditions were as follows.

1. Substrate 24: glass plate
2. Substrate temperature: 100° C.
3. Vapor deposition rates:
   Ni 20 Å/sec
   C 5.0 Å/sec
4. Degree of vacuum: $1.0 \times 10^{-5}$ Torr during the vapor deposition
5. Film thickness: 0.5 μm

Example 8

Figure 6:
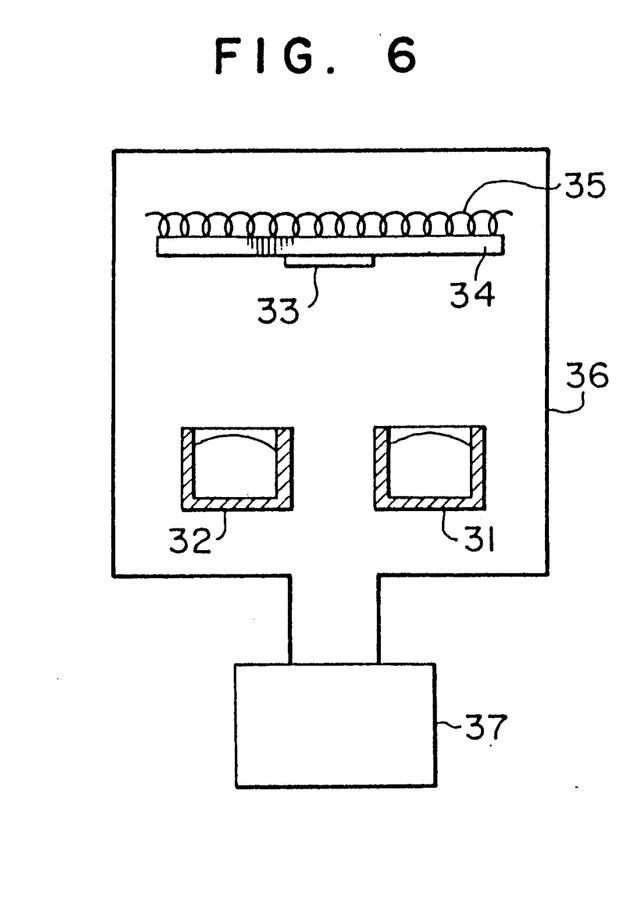

With a vacuum vapor deposition apparatus comprising a vacuum chamber 36 provided with an evacuation system 37, a substrate holder 34 with a substrate heater 35 and a substrate 33, and a Si crucible 32 and a ferromagnetic metal crucible 31 as shown in FIG. 6, a Ni-Si film was formed on the substrate 33. Both Ni and Si were subjected to vacuum vapor deposition by heating with electron guns. The vapor deposition conditions were as follows:

1. Substrate 33: glass
2. Substrate temperature: 100° C.
3. Vapor deposition rates:
   Ni 20 Å/sec
   Si 3.0 Å/sec
4. Degree of vacuum: $1.5 \times 10^{-5}$ Torr during the vapor deposition
5. Film thickness: 0.5 μm Magnetic properties of the magnetic recording media prepared in the foregoing Examples 1 to 8 were measured with a vibrating sample magnetometer and compositions of the magnetic films were determined by XPS analysis. The results of the measurements are summarized in the following Table 1.

TABLE 1

| Example | Magnetic film composition* | Saturation magnetization (G) | Coercive force (Oe) ⊥ | " | Squareness ratio ⊥ | " |
|---|---|---|---|---|---|---|
| 1 | (a) | 300 | 400 | 100 | 0.10 | 0.08 |
| 2 | (b) | 290 | 350 | 110 | 0.09 | 0.10 |
| 3 | (c) | 350 | 370 | 85 | 0.08 | 0.15 |
| 4 | (d) | 330 | 380 | 80 | 0.08 | 0.15 |
| 5 | (e) | 340 | 330 | 83 | 0.07 | 0.13 |
| 6 | (f) | 335 | 310 | 80 | 0.06 | 0.12 |
| 7 | (g) | 280 | 410 | 110 | 0.11 | 0.09 |
| 8 | (h) | 285 | 430 | 120 | 0.12 | 0.10 |

Remarks*
(a) $Ni_{0.9}Co_{0.1}$
(b) $Ni_{0.85}Si_{0.15}$
(c) $(Ni_{0.78}Co_{0.22})_{0.87}C_{0.13}$
(d) $(Ni_{0.79}Co_{0.21})_{0.85}Si_{0.15}$
(e) $(Ni_{0.86}Fe_{0.14})_{0.9}Co_{0.1}$
(f) $(Ni_{0.87}Fe_{0.13})_{0.88}Si_{0.2}$
(g) $Ni_{0.86}Co_{0.14}$
(h) $Ni_{0.87}Si_{0.13}$ The foregoing compositions are all given by atomic ratios of constituent atoms.

As is obvious from the results of Table 1, all the magnetic recording media of the present invention are perpendicular magnetic recording media.

Examples 9 to 12

Figure 7:
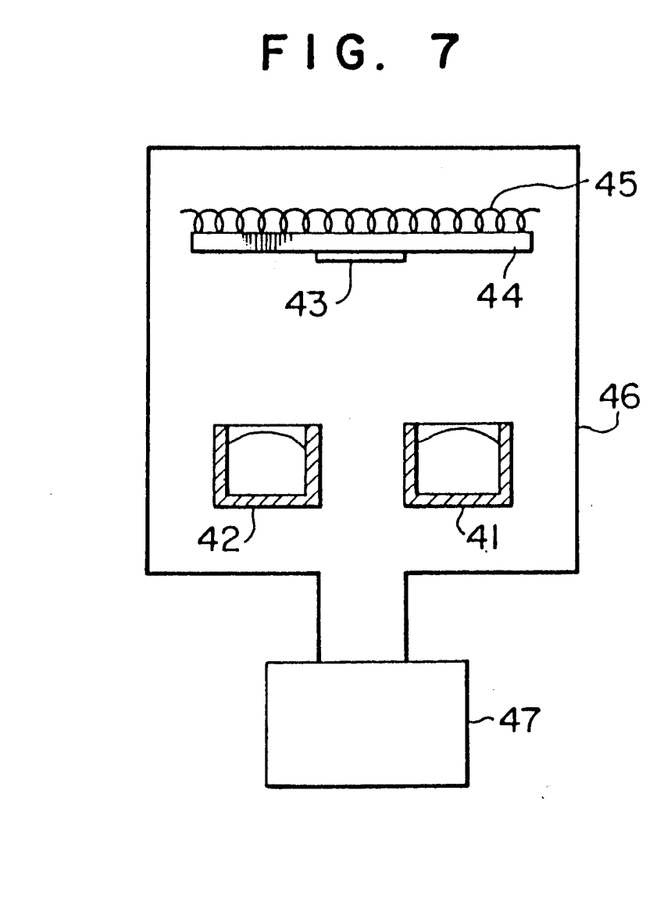

With a vacuum vapor deposition apparatus comprising a vacuum chamber 46 provided with an evacuation system 47, a substrate holder 44 with a substrate heater 45 and a substrate 43, and an organic polymer crucible 42 and a ferromagnetic metal crucible 41, as shown in FIG. 7, C and Si were introduced as polymers and a vapor deposition film was formed on the substrate 43 by simultaneous vapor deposition of Ni and organic polymer under the following conditions, where Ni was subjected to vapor deposition by heating with an electron gun and the organic polymer by resistance heating.

1. Organic polymer: polyethylene (Example 9); modified polyethylene, where some of H was substituted with —COOH and —OH (Example 10); polypropylene (Example 11); and silicone oil (Example 12)
2. Substrate 43: glass and polyethylene terephthalate (PET) films (thickness: 50 μm)
3. Substrate temperature: 50° C.
4. Vapor deposition rates:
   Ni 25 Å/sec
   Organic polymer 1.0 Å/sec
5. Degree of vacuum: $2.0 \times 10^{-5}$ Torr during the vapor deposition Magnetic properties and compositions of the magnetic recording media prepared in the foregoing Examples 9 to 12 were investigated. The results of the measurements are shown in the following Table 2, where the magnetic properties were measured with a vibrating sample magnetometer and the compositions of the magnetic films were determined by XPS analysis, and the compositions of the magnetic films are shown by atomic ratios of constituent atoms Ni, C and Si.

TABLE 2

| Example | Organic polymer | Magnetic film composition | Saturation magnetization (G) | Coercive force (Oe) ⊥ | " | Squareness ratio ⊥ | " |
|---|---|---|---|---|---|---|---|
| 9 | Polyethylene | (i) | 290 | 510 | 150 | 0.15 | 0.08 |
|   |   |   | 295 | 300 | 100 | 0.08 | 0.10 |
| 10 | Modified polyethylene | (j) | 300 | 530 | 140 | 0.16 | 0.08 |
|   |   |   | 305 | 310 | 90 | 0.08 | 0.09 |
| 11 | Polypropylene | (k) | 280 | 500 | 130 | 0.14 | 0.09 |
|   |   |   | 275 | 300 | 100 | 0.07 | 0.10 |
| 12 | Silicone oil | (l) | 275 | 450 | 120 | 0.11 | 0.09 |

TABLE 2-continued

| Example | Organic polymer | Magnetic film composition | Saturation magnetization (G) | Coercive force (Oe) ⊥ | " | Squareness ratio ⊥ | " |
|---|---|---|---|---|---|---|---|
| | | | 280 | 280 | 80 | 0.08 | 0.11 |

Remarks: In the column for the magnetic film composition
(i) $Ni_{0.85}Co_{0.15}$
(j) $Ni_{0.87}Co_{0.13}$
(k) $Ni_{0.84}Co_{0.16}$
(l) $Ni_{0.85}Co_{0.05}Si_{0.10}$
In the columns for saturation magnetization, coercive force and squareness ratio, the upper row is directed to the glass substrate and the lower row to the PET film.

As is obvious from the results of Table 2, all the magnetic recording media of the present invention, prepared in Examples 9 to 12, are perpendicular magnetization recording media. Furthermore, C and Si in the magnetic films of the magnetic recording media were found by XPS analysis to exist in the form of (a) Ni-C and Ni-Si and (b) hydrocarbon compounds and silicone compounds.

Examples 13 and 14

Figures 8, 9:
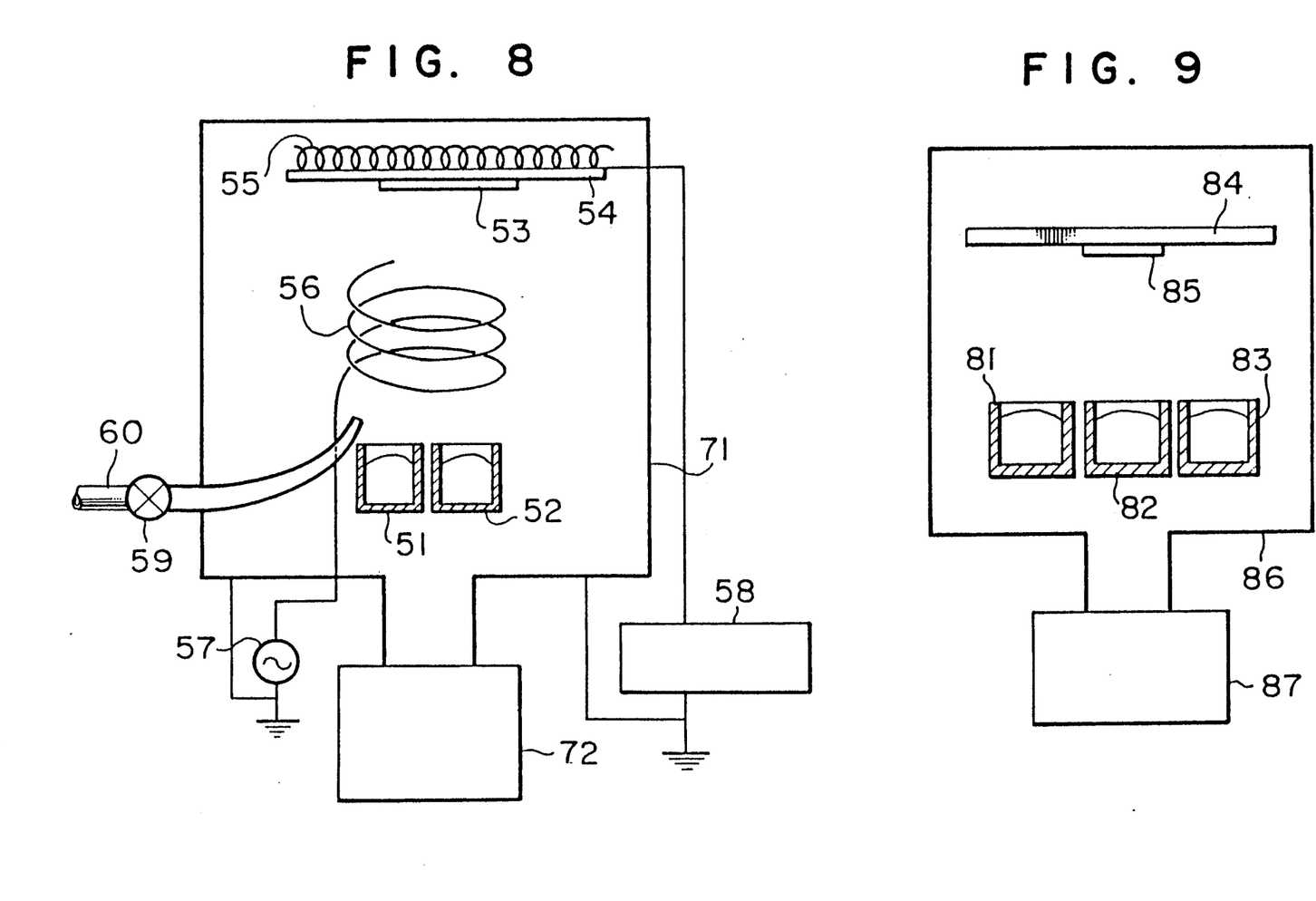

With a radio frequency ion plating apparatus comprising a vacuum chamber 71 provided with an evacuation system 72, a substrate holder 54 with a substrate heater 55 and a substrate 53, the substrate holder 54 being electrically connected to the vacuum chamber 71 through a DC electric source 58, a radio frequency electrode 56, electrically connected to the vacuum chamber 71 through a radio frequency source 57, a monomer feed pipe 60 through a valve 59, and a ferromagnetic metal crucible 51 and an organic polymer crucible 52 provided under the radio frequence electrode 56, as shown in FIG. 8, vapor deposition films were prepared by simultaneous vapor deposition of NiCo-polymer under the following vapor deposition conditions, where a NiCo alloy was subjected to vapor deposition by heating with an electron gun and the polymer by resistance heating.

1. Ferromagnetic metal: $Ni_{80}Co_{20}$ ingot
   Polymer: polyethylene (Example 13) polystyrene (Example 14)
2. Substrate 53: Glass and polyethylene terephthate (PET) films (thickness: 10 μm)
3. Substrate temperature: room temperature
4. Vapor deposition rates:
   Ni-Co 30 Å/sec
   Polymer 2.0 Å/sec
5. Degree of vacuum: $2.0 \times 10^{-5}$ Torr during the vapor deposition
6. Voltage applied to the substrate: −500V

Examples 15 and 16

With the same apparatus as used in Examples 13 and 14, vapor deposition films were prepared under the same conditions as in Examples 13 and 14, except that a monomer gas was introduced through the monomer feed pipe 60 in place of the polymer and polymerized to form a polymer. The fed monomer was benzene (Example (5) and ethylene (Example (6)).

Magnetic properties of the magnetic recording media prepared in the foregoing Examples 15 to 16 and compositions of the magnetic films are shown in the following Table 3, where the magnetic properties were measured with a vibrating sample magnetometer and the compositions of the magnetic films were determined by XPS analysis. The compositions of magnetic films are given by atomic ratios of Ni, Co and C.

TABLE 3

| Example | Organic polymer | Magnetic film composition | Saturation magnetization (G) | Coercive force (Oe) ⊥ | " | Squareness ratio ⊥ | " |
|---|---|---|---|---|---|---|---|
| 13 | Polyethylene | (m) | 300 | 500 | 120 | 0.15 | 0.08 |
| | | | 305 | 300 | 90 | 0.08 | 0.10 |
| 14 | Polystyrene | (n) | 305 | 510 | 120 | 0.15 | 0.08 |
| | | | 295 | 320 | 100 | 0.08 | 0.10 |
| 15 | Benzene | (o) | 310 | 450 | 90 | 0.13 | 0.10 |
| | | | 305 | 280 | 90 | 0.07 | 0.11 |
| 16 | Ethylene | (p) | 300 | 430 | 80 | 0.13 | 0.10 |
| | | | 308 | 290 | 80 | 0.07 | 0.12 |

Remarks: In the column for the magnetic film composition
(m) $(Ni_{0.78}Co_{0.22})_{0.85}C_{0.15}$
(n) $(Ni_{0.78}Co_{0.22})_{0.84}C_{0.16}$
(o) $(Ni_{0.77}Co_{0.23})_{0.86}C_{0.14}$
(p) $(Ni_{0.79}Co_{0.21})_{0.85}C_{0.15}$
In the columns for the saturation magnetization, coercive force and squareness ratio, the upper row is directed to the glass substrate and the lower row to the PET film substrate.

It can be seen from the foregoing results that all the magnetic recording media, prepared in Examples 13 to 16, are perpendicular magnetization recording media. Furthermore, it was found by XPS analysis that C in the films of the magnetic recording media of Examples 13 and 14 existed as (a) carbides of NiCo alloy and (b) hydrocarbon compounds and that of Examples 15 and 16 existed as (a) carbides of NiCo alloy, (b) hydrocarbon compounds and (c) amorphous carbon.

Examples 17 to 19

A Ni-C film and a Ni-Si film shown in Examples 1 and 2, respectively, and a Ni-polyethylene film shown in Example 9 were prepared in the form of a rectangular shape, 5 cm long × 1 cm wide, on polyethylene terephthate (PET) film substrates (thickness 40 μm) under the vapor deposition conditions given in Examples 1, 2 and 9.

Comparative Example 1

With the same vacuum vapor deposition apparatus as shown in FIG. 7, a CoCr film was prepared to a thickness of 0.2 μm on a substrate under the following conditions, where CoCr was vapor deposited by heating with an electron gun.
1. Ingot: $Co_{80}Cr_{20}$ (wt %)
2. Substrate: Polyimide film (thickness: 40 μm; size 50 cm×1 cm)
3. Vapor deposition rate: 20 Å/sec
4. Degree of vacuum: $5.0 \times 10^{-6}$ Torr
5. Substrate temperature: 150° C.

Comparative Example 2

With the same vacuum vapor deposition apparatus as in FIG. 7, a vapor deposition film was prepared in the same manner as in Comparative Example 1, except that a Cr layer was formed at first to a thickness of 0.05 μm on the substrate and then a CoCr layer to a thickness of 0.2 μm thereon. The Cr vapor deposition conditions are as follows:
1. Vapor deposition rate: 20 Å/sec
2. Substrate temperature: 150° C.
3. Degree of vacuum: $5.0 \times 10^{-6}$ Torr Magnetic properties of the magnetic recording media prepared in Comparative Examples 1 and 2 were measured with a vibrating sample magnetomer. The results of the measurements are shown in the following Table 4.

TABLE 4

| Comparative Example | Saturation magnetization (G) | Coercive force (Oe) ⊥ | Coercive force (Oe) ∥ | Squareness ratio ⊥ | Squareness ratio ∥ |
|---|---|---|---|---|---|
| 1 | 400 | 500 | 200 | 0.20 | 0.11 |
| 2 | 410 | 400 | 350 | 0.06 | 0.62 |

It can be seen from the foregoing results that the magnetic recording media of Comparative Examples 1 and 2 are a perpendicular magnetization recording medium and an in-plane magnetization recording medium based on CoCr, respectively.

The running property and durability of the magnetic recording media prepared in Examples 17 to 19 and Comparative Examples 1 and 2 were determined in the following manner. A stainless steel pin (4 mm in diameter, polished with an abrasive having a surface roughness #2,000) was brought in contact with the magnetic recording medium under a load of 20 g and subjected to sliding at a speed of 1.7 cm/sec up to 100 passes to determine the frictional force during the sliding and the presence of flaws on the surface after the sliding.

Changes in the coefficient of friction of the magnetic recording media of Examples 17 to 19 and comparative Examples 1 and 2 are shown in the following Table 5.

TABLE 5

| | Coefficient of friction (sliding pass number) | | | | | |
|---|---|---|---|---|---|---|
| | (2) | (5) | (10) | (20) | (50) | (100) |
| Ex. 17 | 0.23 | 0.23 | 0.23 | 0.25 | 0.28 | 0.30 |
| Ex. 18 | 0.25 | 0.25 | 0.25 | 0.27 | 0.30 | 0.35 |
| Ex. 19 | 0.19 | 0.20 | 0.25 | 0.27 | 0.29 | 0.32 |
| Comp. Ex. 1 | 0.30 | 0.40 | — | — | — | — |
| Comp. Ex. 2 | 0.35 | 0.45 | — | — | — | — |

Remarkes: "-" in Table 5 means that the measurement was impossible to make.

The degree of flaws after 100 passes was one streak flaw on the sliding area of the magnetic recording medium of Example 17; one streak flaw and another small flaw on the sliding area of the magnetic recording medium of Example 18, and three streak flaws on the sliding area of the magnetic recording medium of Example 19, whereas in both cases of the magnetic recording media of Comparative Examples 1 and 2 the magnetic layer was peeled off after 10 passes and the measurement of the coefficient of friction was impossible to make.

It can be seen from the foregoing results that the magnetic recording media of the present invention are distinguished in the running property and the mechanical durability.

Examples 20 to 22

With the same vacuum vapor deposition apparatus as shown in FIG. 7, a (NiCo)-polyethylene film was formed on a substrate by simultaneous vacuum vapor deposition of NiCo alloy and polyethylene under the following conditions.
1. Ferromagnetic material: NiCo alloy
2. Polymer: polyethylene (average molecular weight: 1,000)
3. Substrate: glass
4. Substrate temperature: 150° C.
5. Vapor deposition rates:
   NiCo 20 Å/sec
   polyethylene 1.0 Å/sec
6. Degree of vacuum: $5.0 \times 10^{-7}$ Torr maximum before the vapor deposition and $1.0-2.0 \times 10^{-5}$ Torr during the vapor deposition NiCo was subjected to vacuum vapor deposition by heating with an electron gun and polyethylene by resistance heating. By changing the composition of NiCo alloy for the vacuum vapor deposition, $(Ni_{1-x}Co_x)$-polyethylene films with x=0.2, 0.4, and 0.6 were prepared. Carbon concentration was 5% by atom.

Comparative Examples 3 and 4

$(Ni_{1-x}Co_x)$-polyethylene films with x=0.8 and 1.0 were prepared by changing the composition of ferromagnetic ingot for the vacuum vapor deposition under the same conditions as in Examples 20 to 22. The carbon concentration of the films was 5% by atom.

Examples 23 to 29

Ni-polyethylene films having carbon concentrations of 2, 4, 6, 8, 10, 20 and 30% by atom in the magnetic layer were prepared under the same conditions as in Examples 20 to 22, except that Ni was used as a ferromagnetic metal and changing the vapor deposition rate of the polymer.

Comparative Examples 5 to 8

Ni-polyethylene films having carbon concentrations of 0.5, 1, 40 and 60% by atom were prepared under the same conditions as in Examples 23 to 29, except that the vapor deposition rate of the polymer was changed.

Magnetic properties of the magnetic recording media prepared in Examples 20 to 22 and Comparative Examples 3 and 4 were measured by a vibrating sample magnetometer. The results of the measurements are shown in the following Table 6.

TABLE 6

|  | X | Saturation magnetization (G) | Coercive force (Oe) ⊥ | Coercive force (Oe) ″ | Squareness ratio ⊥ | Squareness ratio ″ |
|---|---|---|---|---|---|---|
| Ex. 20 | 0.2 | 400 | 510 | 80 | 0.2 | 0.06 |
| Ex. 21 | 0.4 | 650 | 450 | 75 | 0.18 | 0.05 |
| Ex. 22 | 0.6 | 750 | 410 | 70 | 0.16 | 0.04 |
| Comp. Ex. 3 | 0.8 | 1000 | 100 | 55 | 0.09 | 0.60 |
| Comp. Ex. 4 | 1.0 | 1200 | 80 | 50 | 0.05 | 0.07 |

Remarks: 'x' means x in $Ni_{x-1}Co_x$.

Likewise, magnetic properties of the magnetic recording media prepared in Examples 23 to 29 and Comparative Examples 5 to 8 were measured by a vibrating sample magnetometer. The results of the measurements are shown in the following Table 7.

TABLE 7

| Example | Carbon concentration (% by atom) | Saturation magnetization (G) | Coercive force (Oe) ⊥ | Coercive force (Oe) ″ | Squareness ratio ⊥ | Squareness ratio ″ |
|---|---|---|---|---|---|---|
| Ex. 23 | 2 | 420 | 400 | 60 | 0.18 | 0.06 |
| Ex. 24 | 4 | 400 | 440 | 70 | 0.20 | 0.07 |
| Ex. 25 | 6 | 360 | 500 | 80 | 0.22 | 0.08 |
| Ex. 26 | 8 | 320 | 460 | 75 | 0.20 | 0.08 |
| Ex. 27 | 10 | 250 | 440 | 70 | 0.19 | 0.07 |
| Ex. 28 | 20 | 220 | 420 | 65 | 0.18 | 0.07 |
| Ex. 29 | 30 | 200 | 400 | 60 | 0.17 | 0.06 |
| Comp. Ex. 5 | 0.5 | 470 | 100 | 20 | 0.01 | 0.02 |
| Comp. Ex. 6 | 1 | 465 | 150 | 40 | 0.05 | 0.03 |
| Comp. Ex. 7 | 40 | 150 | 200 | 50 | 0.06 | 0.04 |
| Comp. Ex. 8 | 80 | — | — | — | — | — |

As is obvious from the results of the foregoing Tables 6 and 7, magnetic recording media having a suitable coercive force for the magnetic recording medium can be obtained by making the Ni content at least 30% by atom and the carbon concentration of the magnetic layer 2 to 30% by atom.

Examples 30 to 43

With a vacuum vapor deposition apparatus comprising a vacuum chamber 86 provided with an evacuation system 87, a substrate holder 84 with a substrate 85, and a ferromagnetic metal crucible 81, an organic polymer crucible 82 and an intermediate layer material curcible 83, an intermediate layer was formed on the substrate 85 from an intermediate layer-forming material such as Ta, Sc, Zr, Ti, Ru, Rh, Pd, Os, Ir, Pt, Cu, Ag, Au or Ni in the crucible 83 and then a Ni-polyethylene film was formed on the intermediate layer from Ni and polyethylene in the crucibles 81 and 82, respectively, by simultaneous vacuum vapor deposition of Ni and polyethylene under the following conditions.

1. Ferromagnetic material: Ni
2. Polymer: polyethylene
3. Intermediate layer-forming material: Ta, Sc, Zr, Ti, Ru, Rh, Pd, Os, Ir, Pt, Cu, Ag, Au or Ni
4. Substrate: polyimide (thickness: 50 μm)
5. Substrate temperature: room temperature.

| 6. Vapor deposition rates: | Intermediate layer | 20 Å/sec |
|---|---|---|
|  | Ni | 20 Å/sec |
|  | Polymer | 1.0 Å/sec |

7. Degree of vacuum: $5.0 \times 10^{-6}$ Torr during the formation of the intermediate layer; $1.0$–$2.0 \times 10^{-5}$ Torr during the formation of the Ni-polyethylene film Ni and the intermediate layer-forming material were subjected to vacuum vapor deposition by heating with electron guns and polyethylene by resistance heating.

Examples 44 to 48

Magnetic recording media were prepared under the same conditions as in Example 30, except that a NiCo alloy (90 wt% Ni-10 wt% Co as an ingot) was used as a ferromagnetic material and Ti, Ta, Sc, Cu, Ni and Co were used as an intermediate layer-forming material.

Comparative Example 9

A magnetic recording medium was prepared by direct formation of the Ni-polyethylene film on the substrate under the same conditions as in Example 30, except that no intermediate layer was formed.

Comparative Example 10

A magnetic recording medium was prepared by direct formation of a NiCo-polyethylene film on the substrate under the same conditions as in Example 44, except that no intermediate layer was formed.

Magnetic properties of the magnetic recording media prepared in Examples 30 to 43 and Comparative Example 9 were measured with a vibrating sample magnetometer (VSM). The results of the measurements are shown in the following Table 8.

TABLE 8

|  | Intermediate layer-forming material | Saturation magnetization (G) | Perpendicular coercive force (Oe) | In-plane coercive force (Oe) |
|---|---|---|---|---|
| Ex. 30 | Ti | 300 | 400 | 100 |
| Ex. 31 | Sc | 290 | 350 | 80 |
| Ex. 32 | Zr | 295 | 320 | 90 |
| Ex. 33 | Ta | 305 | 400 | 90 |
| Ex. 34 | Ru | 290 | 370 | 80 |
| Ex. 35 | Rh | 295 | 350 | 70 |
| Ex. 36 | Pd | 290 | 360 | 70 |
| Ex. 37 | Os | 300 | 380 | 80 |
| Ex. 38 | Ir | 305 | 370 | 80 |
| Ex. 39 | Pt | 300 | 380 | 80 |
| Ex. 40 | Cu | 290 | 390 | 90 |
| Ex. 41 | Ag | 295 | 370 | 100 |
| Ex. 42 | Au | 300 | 370 | 100 |
| Ex. 43 | Ml | 400 | 280 | 200 |

TABLE 8-continued

|  | Intermediate layer-forming material | Saturation magnetization (G) | Perpendicular coercive force (Oe) | In-plane coercive force (Oe) |
|---|---|---|---|---|
| Comp. Ex. 9 | — | 300 | 200 | 150 |

As is obvious from the results of FIG. 8, the magnetic recording media having an intermediate layer have a high perpendicular coercive force and thus have distinguished characteristics as a magnetic recording medium. When Ni is used as an intermediate layer-forming material, the magnetic recording medium has a higher in-plane coercive force, because Ni forms a magnetic thin film with in-plane magnetization, and the medium has a higher perpendicular coercive force and thus the magnetic characteristics of the magnetic recording medium itself are improved.

Likewise, magnetic properties of the magnetic recording media prepared in Examples 44 to 48 and Comparative Example 10 were measured and the results of the measurements are shown in the following Table 9.

TABLE 9

|  | Intermediate layer-forming material | Saturation magnetization (G) | Perpendicular coercive force (Oe) | In-plane coercive force (Oe) |
|---|---|---|---|---|
| Ex. 44 | Tl | 405 | 350 | 50 |
| Ex. 45 | Ta | 410 | 320 | 40 |
| Ex. 46 | Sc | 380 | 370 | 60 |
| Ex. 47 | Cu | 390 | 360 | 55 |
| Ex. 48 | NiCo | 460 | 250 | 200 |
| Comp. Ex. 10 | — | 400 | 100 | 90 |

As is obvious from the results of Table 9, the magnetic recording media having an intermediate layer below the NiCo-polyethylene magnetic layer has a higher perpendicular coercive force and the characteristics as the magnetic recording media are improved. When the NiCo alloy is used as an intermediate layer-forming material, the magnetic recording medium has a higher in-plane coercive force, because the NiCo alloy forms a magnetic thin film with in-plane magnetrization, but the medium has a higher perpendicular coercive force and thus the magnetic properties of the magnetic recording layer itself is improved.

It can be seen from the foregoing results that the crystal growth of the ferromagnetic material can be promoted by forming an intermediate layer of a specific material on a substrate and then forming a magnetic layer by simultaneous vapor deposition of a ferromagnetic material and an organic polymer, and magnetic recording media with a distinguished perpendicular magnetization characteristic can be obtained.

Examples 49 to 53

Figure 10:
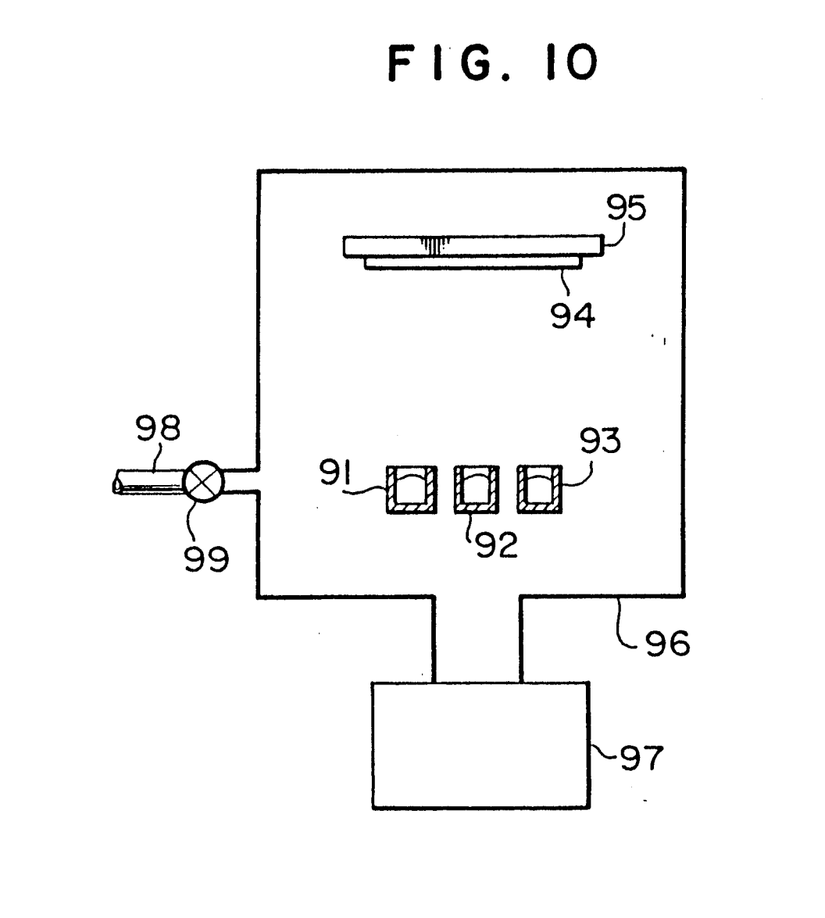

With a vacuum vapor deposition apparatus comprising a vacuum chamber 96 provided with an evacuation system 97 and a gas inlet pipe 98 through a valve 99, a substrate holder 95 with a substrate 94 and a ferromagnetic metal crucible 91, an organic polymer crucible 92 and a solid protective layer crucible 93, as shown in FIG. 10, a Ni-polyethylene magnetic thin film with perpendicular magnetization was formed to a thickness of 0.2 μm on a polyethylene terephthalate (PET) substrate (thickness: 20 μm; size: 10 cm × 1 cm) and a solid protective layer was successively formed to a thickness of 200 Å thereon under the following conditions. As the solid protective layer, B (Example 30), boron nitride (Example 31), nickel oxide (Example 32), nickel nitride (Example 33) or silicon oxide (Example 34) was formed. The nitrides and the oxides were formed by vapor deposition in a nitrogen gas atmosphere and in an oxygen gas atmosphere, respectively. Then, an aliphatic lubricating layer of calcium stearate was formed to a thickness of 50 Å thereon by dipping.

Vapor deposition conditions:
(I) Ni-polyethylene magnetic layer with perpendicular magnetization:
  (1) Vapor deposition rates:
    N; 20 Å/sec
    polyethylene 1.0 Å/sec
  (2) Degree of vacuum: $1.0 \times 10^{-5}$ Torr
  (3) Substrate temperature: room temperature
(II) Solid protective layer:
  (1) Vapor deposition rates: 5 Å/sec
  (2) Degree of vacuum: $5 \times 10^{-6}$ Torr
    (Oxygen partial pressure in the oxygen gas atmosphere: $5.0 \times 10^{-5}$ Torr)
    (Nitrogen partial pressure in the nitrogen gas atmosphere: $5.0 \times 10^{-5}$ Torr)
  (3) Substrate temperature: room temperature

Example 54

Figure 11:
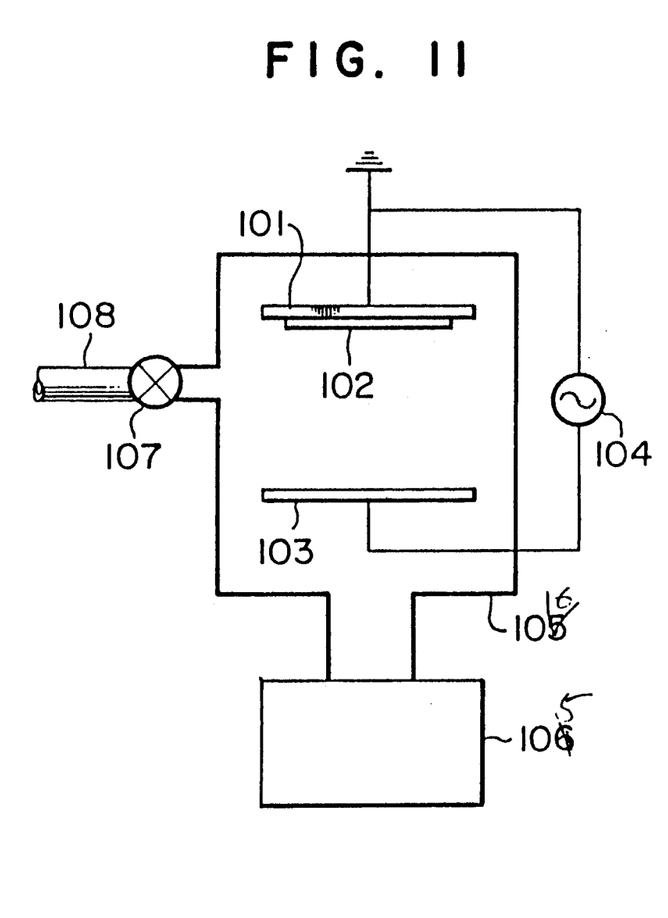

With a plasma polymerization apparatus comprising a vacuum chamber 106 provided with an evacuation system 105, a gas inlet pipe 108 through a valve 107, a substrate electrode 101 with a substrate 102 and a radio frequency electrode 103, the substrate electrode 101 being electrically connected to the radio frequency electrode 103 through a radio frequency power source 104, as shown in FIG. 11, a carbon film was formed to a thickness of 200 Å on the Ni-polyethylene magnetic thin film with perpendicular magnetization prepared in Example 49, and a lubricating layer of calcium stearate was successively formed to a thickness of 50 Å thereon by dipping.

Plasma polymerization conditions
  (1) Gas pressure : 10 m Torr
  (2) Gas species ethylene
  (3) Gas flow rate: 1 sccm
  (4) Input power 1 W/cm$^2$

Examples 55-59

A boron protective film was formed on the Ni-polyethylene magnetic thin film with perpendicular magnetization prepared in Example 49, and then an aliphatic lubricating layer was formed to a thickness of 50 Å thereon by vacuum vapor deposition. As the aliphatic lubricant, stearic acid, stearyl alcohol, stearyl amide, calcium stearate and an ester of stearic acid with butyl alcohol (butyl stearate) were used.

Comparative Examples 11 to 16 friction during the sliding test and the presence of flaws on the surface after 100 passes. The results are shown in the following Table 10, where "-" in the column "coefficient of friction" means that the film was peeled off and the measurement was impossible to make.

TABLE 10

| Example | Solid protective layer | Aliphatic lubricant | Coefficient of friction (sliding pass number) | | | | | |
|---|---|---|---|---|---|---|---|---|
| | | | (2) | (5) | (10) | (20) | (50) | (100) |
| Ex. 49 | B | Calcium stearate | 0.20 | 0.20 | 0.20 | 0.21 | 0.21 | 0.22 |
| Ex. 50 | Boron nitride | " | 0.20 | 0.20 | 0.21 | 0.21 | 0.22 | 0.22 |
| Ex. 51 | Nickel oxide | " | 0.20 | 0.20 | 0.20 | 0.21 | 0.21 | 0.21 |
| Ex. 52 | Nickel nitride | " | 0.20 | 0.20 | 0.20 | 0.20 | 0.21 | 0.21 |
| Ex. 53 | Silicon oxide | " | 0.20 | 0.20 | 0.20 | 0.21 | 0.21 | 0.21 |
| Ex. 54 | Carbon | " | 0.20 | 0.20 | 0.21 | 0.21 | 0.22 | 0.22 |
| Ex. 55 | B | Stearic acid | 0.20 | 0.20 | 0.20 | 0.21 | 0.21 | 0.22 |
| Ex. 56 | B | Stearyl alcohol | 0.20 | 0.20 | 0.21 | 0.21 | 0.22 | 0.22 |
| Ex. 57 | B | Stearyl amide | 0.20 | 0.21 | 0.21 | 0.22 | 0.22 | 0.22 |
| Ex. 58 | B | Calcium stearate | 0.20 | 0.20 | 0.20 | 0.21 | 0.21 | 0.21 |
| Ex. 59 | B | Butyl stearate | 0.20 | 0.21 | 0.21 | 0.22 | 0.22 | 0.23 |
| Comp. Ex. 11 | B | — | 0.30 | 0.32 | 0.35 | 0.40 | 0.42 | 0.44 |
| Comp. Ex. 12 | Boron nitride | — | 0.40 | 0.42 | 0.44 | 0.50 | — | — |
| Comp. Ex. 13 | Nickel oxide | — | 0.35 | 0.38 | 0.42 | 0.46 | — | — |
| Comp. Ex. 14 | Nickel nitride | — | 0.41 | 0.42 | 0.45 | 0.47 | 0.50 | — |
| Comp. Ex. 15 | Silicon oxide | — | 0.31 | 0.33 | 0.35 | 0.40 | — | — |
| Comp. Ex. 16 | Carbon | — | 0.25 | 0.28 | 0.32 | 0.34 | 0.40 | 0.42 |
| Comp. Ex. 17 | — | Calcium stearate | 0.20 | 0.21 | 0.23 | 0.27 | 0.29 | 0.32 |
| Comp. Ex. 18 | — | — | 0.20 | 0.21 | 0.25 | 0.29 | 0.32 | 0.35 |

Only a solid protective layer was formed on the Ni-polyethylene magnetic thin film with perpendicular magnetization prepared in Examples 49 to 53 to prepare magnetic recording media.

Comparative Example 17

Only a lubricating layer of calcium stearate was formed on the Ni-polyethylene magnetic thin film with perpendicular magnetization prepared in Examples 49 to 53 by dipping without providing any solid protective layer, whereby magnetic recording media were prepared.

Comparative Example 18

A magnetic recording medium having only a Ni-polyethylene magnetic thin film with perpendicular magnetization on a non-magnetic substrate was prepared.

A stainless steel pin, 4 mm in diameter, polished with an abrasive having a surface roughness #2,000, was brought in contact with the magnetic recording media prepared in the foregoing Examples 49 to 59 and Comparative Examples 11 to 18 under a load of 2 g and subjected to 100 passes of reciprocal sliding at a sliding speed of 1.6 cm/sec to investigate the coefficient of As in obvious from the results of Table 10, a lubricating layer must be provided when a solid protective layer is provided.

The magnetic recording media prepared in Examples 49 to 59 and Comparative Examples 17 and 18 were left standing outdoors for two weeks and then subjected to the sliding test as above. The results are shown in the following Table 11.

TABLE 11

| Example | Solid protective layer | Aliphatic lubricant | Coefficient of friction (sliding pass number) | | | | | |
|---|---|---|---|---|---|---|---|---|
| | | | (2) | (5) | (10) | (20) | (50) | (100) |
| Ex. 49 | B | Calcium stearate | 0.20 | 0.20 | 0.21 | 0.21 | 0.22 | 0.24 |
| Ex. 50 | Boron nitride | " | 0.21 | 0.21 | 0.22 | 0.24 | 0.24 | 0.26 |
| Ex. 51 | Nickel oxide | " | 0.22 | 0.22 | 0.24 | 0.26 | 0.28 | 0.28 |
| Ex. 52 | Nickel nitride | " | 0.20 | 0.20 | 0.20 | 0.20 | 0.21 | 0.21 |
| Ex. 53 | Silicon oxide | " | 0.22 | 0.22 | 0.22 | 0.24 | 0.24 | 0.24 |
| Ex. 54 | Carbon | " | 0.23 | 0.23 | 0.23 | 0.25 | 0.26 | 0.27 |
| Ex. 55 | B | Stearic acid | 0.21 | 0.21 | 0.22 | 0.22 | 0.24 | 0.26 |
| Ex. 56 | B | Stearyl alcohol | 0.20 | 0.20 | 0.20 | 0.21 | 0.21 | 0.22 |
| Ex. 57 | B | Stearyl amide | 0.20 | 0.20 | 0.20 | 0.22 | 0.21 | 0.21 |
| Ex. 58 | B | Calcium stearate | 0.22 | 0.22 | 0.22 | 0.24 | 0.24 | 0.26 |
| Ex. 59 | B | Butyl stearate | 0.23 | 0.23 | 0.23 | 0.24 | 0.26 | 0.26 |
| Comp. Ex. 17 | — | Calcium stearate | 0.35 | 0.37 | 0.40 | 0.27 | — | — |
| Comp. Ex. 18 | — | — | 0.40 | 0.45 | 0.50 | 0.29 | — | — |

The surfaces of the magnetic recording media of Comparative Examples 17 and 18 turned white when left standing outdoors. When the white-turned surfaces were analyzed by Auger electron spectroscopy, S, Cl and O were detected besides Ni-C and thus it was found that he media were corroded. When the corrosion was investigated as to S, Cl and O in the depth direction, S, Cl and O were not detected at a depth of 200 to 300 Å from the surface. It seems that the corrosion took place only in the surface region.

On the other hand, no color change was visually detected on the surfaces of the magnetic recording media prepared in the foregoing Examples.

When the magnetic recording media were subjected to a sliding test, the corroded region was peeled off in case of the media of the Comparative Examples, producing abrasion dusts. The magnetic layer was peeled off due to the abrasion dusts and the coefficient of friction was increased immediately after the start of the test. On the other hand, in case of the media of the foregoing Examples, the coefficient of friction was not substantially changed from the start of the test to its end, and the durability was not lowered, either.

It can be seen from the foregoing results that it is desirable in view of actual application circumstances to provide a solid protective layer on the surface and further provide a lubricating layer thereon.

Examples 60-64

With the same vacuum vapor deposition apparatus as shown in FIG. 10, a Ni-polyethylene magnetic thin film with perpendicular magnetization was formed to a thickness of 0.2 $\mu$m on a polyethylene terephthalate (PET) substrate (thickness: 20 $\mu$m; size: 10 cm $\times$ 1 cm) and a solid protective layer was successively formed to a thickness of 200 Å thereon under the following conditions. The solid protective layer was composed of boron (Example 60), titanium (Example 61), boron nitride (Example 62), nickel oxide (Example 63) or nickel nitride (Example 64). The nitrides and oxide were formed by vapor deposition in a nitrogen gas atmosphere and in an oxygen gas atmosphere, respectively.

Then, a perfluoropolyether lubricating layer was formed to a thickness of 50 Å thereon by dipping.

Vapor deposition conditions:
(I) Ni-polyethylene magnetic layer with perpendicular magnetization:
  (1) Vapor deposition rates:
    Ni 20 Å/sec
    polyethylene 1.0 Å/sec
  (2) Degree of vacuum: $1.0 \times 10^{-5}$ Torr
  (3) Substrate temperature: room temperature
(II) Solid protective layer:
  (1) Vapor deposition rate: 10 Å/sec
  (2) Degree of vacuum: $5.0 \times 10^{-6}$ Torr
    (Oxygen partial pressure in the oxygen gas atmosphere: $5.0 \times 10^{-5}$ Torr)
    (Nitrogen partial pressure in the nitrogen gas atmosphere: $5.0 \times 10^{-5}$ Torr)
  (3) Substrate temperature: room temperature Example 65

With the same plasma polymerization apparatus as shown in FIG. 11, a carbon film was formed to a thickness of 200 Å on the Ni-polyethylene magnetic thin film with perpendicular magnetization prepared in advance under the same conditions as in Examples 60-64 by plasma polymerization and then a perfluoropolyether lubricating layer was formed to a thickness of 50 Å thereon by dipping.

Plasma polymerization conditions
(1) Gas pressure:10 m Torr
(2) Gas species:ethylene
(3) Gas flow rate:1 sccm
(4) Input power:1 W/cm$^2$ Comparative Example 19

A perfluoropolyether lubricating layer was directly formed on the Ni-polyethylene magnetic thin film with perpendicular magnetization prepared in Example 60 without providing any solid protective layer, whereby a magnetic recording layer was prepared.

Comparative Example 20

A magnetic recording medium having only a Ni-polyethylene magnetic thin film with perpendicular magnetization on a non-magnetic substrate was prepared.

The magnetic recording media prepared in the foregoing Examples 60-65 and Comparative Examples 19 and 20 were left standing outdoors for two weeks and then subjected to the same sliding test as mentioned before. The results of the measurements are shown in the following Table 12.

TABLE 12

| | Solid protective layer | Lubricant layer | Coefficient of friction (sliding pass number) | | | | | |
|---|---|---|---|---|---|---|---|---|
| | | | (2) | (5) | (10) | (20) | (50) | (100) |
| Ex. 60 | B | Provided | 0.20 | 0.20 | 0.20 | 0.21 | 0.22 | 0.24 |
| Ex. 61 | Ti | " | 0.20 | 0.21 | 0.21 | 0.22 | 0.24 | 0.24 |
| Ex. 62 | Boron nitride | " | 0.21 | 0.21 | 0.22 | 0.24 | 0.26 | 0.30 |
| Ex. 63 | Nickel oxide | " | 0.20 | 0.20 | 0.21 | 0.21 | 0.22 | 0.22 |
| Ex. 64 | Nickel nitride | " | 0.20 | 0.21 | 0.21 | 0.22 | 0.23 | 0.24 |
| Ex. 65 | Carbon | " | 0.20 | 0.21 | 0.22 | 0.23 | 0.25 | 0.27 |
| Comp. Ex. 19 | — | " | 0.25 | 0.30 | 0.25 | 0.45 | 0.50 | — |
| Comp. Ex. 20 | — | none | 0.38 | 0.42 | 0.50 | — | — | — |

As is obvious from the foregoing results, a magnetic recording medium having a good durability can be obtained by providing a solid protective layer on a magnetic layer and further providing a fluorine-based lubricating layer thereon.

As described in detail above, a magnetic recording medium having a good head running property, a high durability and a high coercive force can be obtained by providing a magnetic layer comprising a ferromagnetic material having a face-centered cubic structure and at least one of C, Si, carbon compounds and silicon compounds on a non-magnetic substrate.

Furthermore, a magnetic recording medium having a much higher coercive force can be obtained by providing a specific intermediate layer on a non-magnetic substrate and forming the magnetic layer on the intermediate layer, thereby promoting growth of acicular crystals of the ferromagnetic material.

In the formation of the magnetic layer, C and Si can be introduced as simple atomic substances or as polymers or as monomers capable of forming the polymers.

Still furthermore, a magnetic recording medium having a good corrosion resistance and a high durability can be obtained by providing a solid protective layer on the magnetic layer of the magnetic recording layer and a lubricating layer thereon.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium, which comprises a non-magnetic substrate and a magnetic layer comprised of a ferromagnetic material grown substantially perpendicular on said substrate having a face-centered cubic structure and at least one of carbon, silicon, a hydrocarbon compound and an organosilicon compound, provided on said non-magnetic substrate.

2. A magnetic recording medium according to claim 1, wherein said ferromagnetic material having a face-centered cubic structure is Ni or a Ni-based alloy.

3. A magnetic recording medium according to claim 2, wherein said Ni-based alloy has a Ni content of at least 30% by atom.

4. A magnetic recording medium according to claim 1, wherein the magnetic layer is 2 to 30% by atom.

5. A magnetic recording medium according to claim 1, wherein the hydrocarbon compound and the organosilicon compound are organic polymers, respectively.

6. A magnetic recording medium according to claim 2, wherein the Ni or Ni-based alloy as the ferromagnetic material having a face-centered cubic structure has an acicular structure.

7. A magnetic recording medium according to claim 1, further including a solid protective film on said magnetic layer and an aliphatic or fluorine-based lubricating layer on said protective film.

8. A magnetic recording medium according to claim 7, wherein the solid protective layer is selected from the group consisting of C, B, Ti, Zr, Si, silicon carbide, boron carbide, silicon nirride, boron nitride, and silicon oxide and combinations thereof.

9. A magnetic recording medium according to claim 7, wherein an aliphatic lubricant for forming the aliphatic lubricating layer is selected from the group consisting of fatty acids, metal salts of fatty acids, aliphatic alcohols, fatty acid amides and fatty acid esters and combinations thereof.

10. A magnetic recording medium according to claim 7, wherein a fluorine-based lubricant for forming the fluorine-based lubricating layer is a fluorocarbon-based lubricant.

11. A magnetic recording medium according to claim 1, wherein an intermediate layer is provided between the non-magnetic substrate and the magnetic layer.

12. A magnetic recording medium according to claim 11, wherein the intermediate layer is comprised of a material whose lattice constant at the boundary surface with the magnetic layer differs by less than 35% from the lattice constant of acicular Ni or acicular Ni-based alloy in said magnetic layer, provided thereon.

13. A magnetic recording medium according to claim 12, wherein the material for the intermediate layer is selected from the group consisting of Ti, S, Zr, Ta, Ni, Ni alloy, and elements of the 5th and 6th periods of Group VIII of the Periodic Table and of Group Ib of the Periodic Table and combinations thereof.

14. A magnetic recording medium which comprises a non-magnetic substrate and a magnetic layer comprising (a) a ferromagnetic material having a face-centered cubic structure, (b) either carbides or silicides or both of said ferromagnetic material, (c) either amorphous carbon or amorphous silicon or both, and (d) either hydrocarbon compounds or organosilicon compounds or both, provided on the non-magnetic substrate.

15. A magnetic recording medium according to claim 14, wherein said ferromagnetic material having a face-centered cubic structure is Ni or Ni-based alloy.

16. A magnetic recording medium according to claim 15, wherein said Ni-based alloy has a Ni atom content of at least 30%.

17. A magnetic recording medium according to claim 14, wherein the content of at least one of said carbon atoms and Si atoms in the magnetic layer is from 2 to 30% by atom.

18. A magnetic recording medium according to claim 14, further including an intermediate layer between said non-magnetic substrate and said magnetic layer.

19. A magnetic recording layer according to claim 18, wherein said intermediate layer is composed of a material having a lattice constant at the boundary surface with respect to the magnetic layer which differs by less than 35% from the lattice constant of acicular Ni or acicular Ni-based alloy in the magnetic layers, as provided thereon.

* * * * *